(12) United States Patent
Campbell

(10) Patent No.: US 11,308,556 B2
(45) Date of Patent: Apr. 19, 2022

(54) PRESENTING TRADING DATA

(71) Applicant: TradeVision2020, Inc., South Jordan, UT (US)

(72) Inventor: Dan Campbell, South Jordan, UT (US)

(73) Assignee: TradeVision2020, Inc., South Jordan, UT (US)

( * ) Notice: Subject to any disclaimer, the term of this patent is extended or adjusted under 35 U.S.C. 154(b) by 99 days.

(21) Appl. No.: 16/993,429

(22) Filed: Aug. 14, 2020

(65) Prior Publication Data

US 2022/0051321 A1 Feb. 17, 2022

(51) Int. Cl.
*G06Q 40/04* (2012.01)
*H04L 51/42* (2022.01)
*H04W 4/14* (2009.01)

(52) U.S. Cl.
CPC ............ *G06Q 40/04* (2013.01); *H04L 51/22* (2013.01); *H04W 4/14* (2013.01)

(58) Field of Classification Search
CPC .......... G06Q 40/04; H04L 51/22; H04W 4/14
See application file for complete search history.

(56) References Cited

U.S. PATENT DOCUMENTS

| 6,772,132 | B1 * | 8/2004 | Kemp, II | G06Q 30/08 |
| | | | | 705/36 R |
| 2006/0047590 | A1 * | 3/2006 | Anderson | G06Q 40/00 |
| | | | | 705/35 |
| 2008/0183639 | A1 * | 7/2008 | DiSalvo | G06Q 40/02 |
| | | | | 705/36 R |
| 2011/0016060 | A1 * | 1/2011 | Korzinin | G06Q 40/06 |
| | | | | 705/36 R |
| 2014/0067711 | A1 * | 3/2014 | Shah | G06Q 40/06 |
| | | | | 705/36 R |
| 2020/0250750 | A1 * | 8/2020 | Remlinger | G06Q 30/0201 |
| 2020/0273104 | A1 * | 8/2020 | Ushman | G06Q 30/0206 |

FOREIGN PATENT DOCUMENTS

EP 3223227 A1 * 9/2017 ............. G06Q 40/06

OTHER PUBLICATIONS

Axiory: What is a FOREX pair? The FX currency quotes explained, Feb. 26, 2020, FOREX Trading Academy, pp. 1-8 (Year: 2020).*
Nicholls, H.: 7 Popular Technical Indicators and Howto Use Them to Increase Your Trading Profits, Apr. 8, 2018, pp. 1-36 (Year: 2018).*
Li et al.: Individualized Indicator for All: Stock-wise Technical Indicator Optimization with Embedding, Aug. 4-8, 2019, Research Track Paper, KIDD'19, Alaska, USA, pp. 894-902 (Year: 2019).*
Fayek et al.: Multi-objective Optimization of Technical Stock Market Indicators using GAs, Apr. 2013, International Journal of Computer Applications, VI. 68, No. 20, pp. 41-48 (Year: 2013).*
Investopedia: Market Indicators, Internet Archives, Mar. 28, 2018, pp. 1-2. (Year: 2018).*

* cited by examiner

*Primary Examiner* — Bijendra K Shrestha
(74) *Attorney, Agent, or Firm* — Scott D. Thorpe; Kunzler Bean & Adamson

(57) ABSTRACT

For presenting trading data, a method presents a market indicator for at least one trading unit as a dynamic display on price data. The method selects the market indicator through a single action of a user input device positioned over the market indicator. The method presents a technical indicator for the market indicator in real time. The technical indicator is summed across a plurality of time frames.

16 Claims, 15 Drawing Sheets

FIG. 3E

PRESENTING TRADING DATA

FIELD

The subject matter disclosed herein relates to presenting trading data.

BACKGROUND

Description of the Related Art

Trading is enhanced by the presentation of relevant data.

BRIEF SUMMARY

A method for presenting trading data is disclosed. The method presents a market indicator for at least one trading unit as a dynamic display on price data. The method selects the market indicator through a single action of a user input device positioned over the market indicator. The method presents a technical indicator for the market indicator in real time. The technical indicator is summed across a plurality of time frames. An apparatus and program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3E is a screen shot illustrating one embodiment of matrix trade signals;

DETAILED DESCRIPTION

Figure 1:
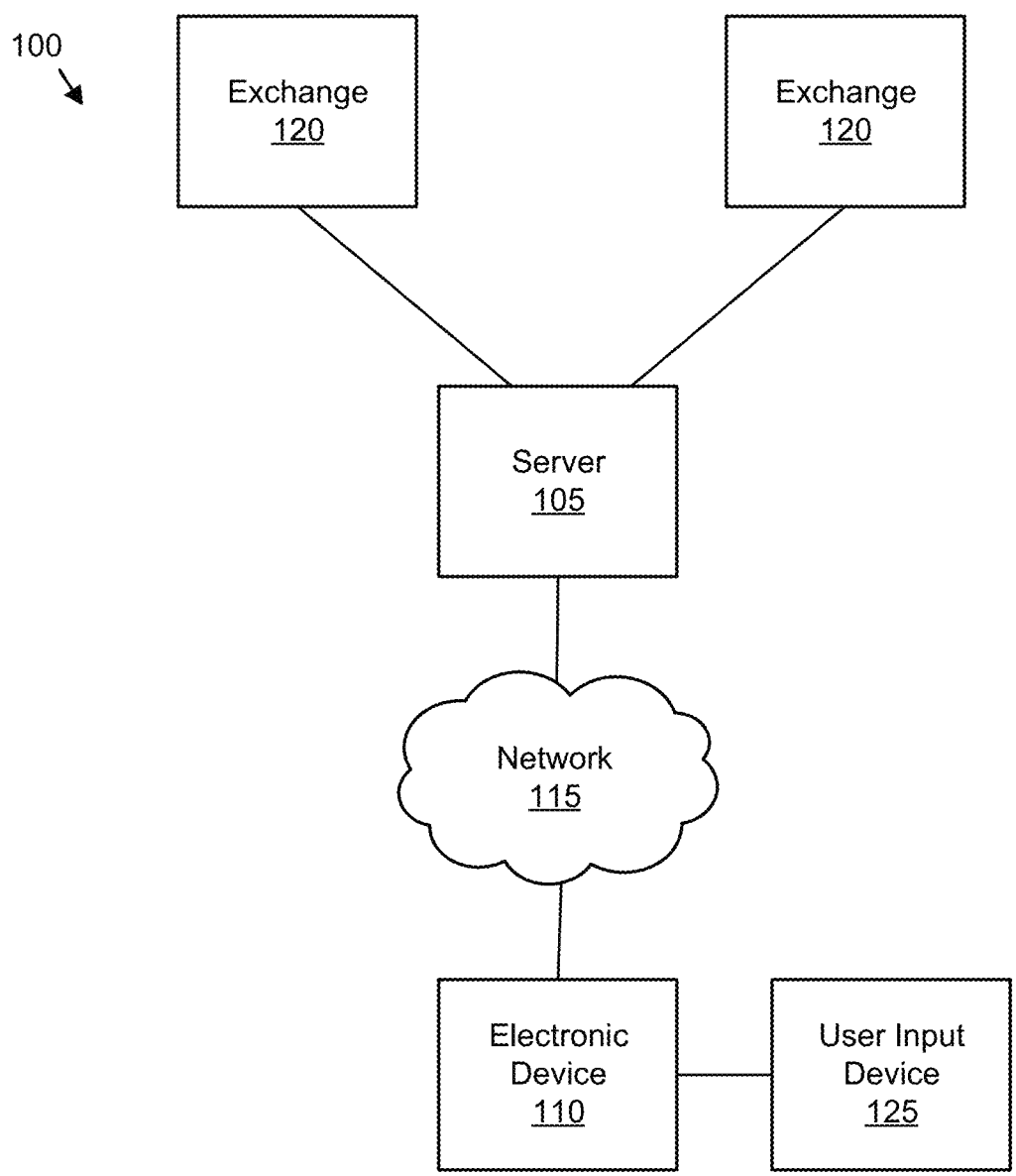
FIG. 1 is a schematic block diagram illustrating one embodiment of a trading system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage medium storing machine-readable code, computer readable code, and/or program code, referred hereafter as code. The computer readable storage medium may be tangible, non-transitory, and/or non-transmission. The computer readable storage medium may not embody signals. In a certain embodiment, the storage devices only employ signals for accessing code.

The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a trading system 100. The system 100 may present information to a user via an electronic device 110. In addition, the system 100 may execute trades for the user via the electronic device 110. In the depicted embodiment, the system 100 includes one or more exchanges 120, a server 105, a network 115, and the electronic device 110. In one embodiment, the electronic device includes a user input device 125.

The exchanges 120 may trade trading units. The trading unit may be a foreign exchange currency pair. In addition, the trading unit may be selected from the group consisting of the foreign exchange currency pair, an equity, a commodity, a futures contract, a derivatives contract, and an option.

The server 105 may receive information from the exchanges 120. The server 105 processes the information and communicates the information via the network 115 to the electronic device 110. The network 115 may be the Internet, a mobile telephone network, a wide area network, a local area network, a Wi-Fi network, or the combinations thereof. The electronic device 110 may be a computer, a mobile telephone, a server, and the like. The user input device 125 may be a computer mouse, a touchscreen, a stylus, and the like.

Trading opportunities for a trading unit may change rapidly. A trader's success is often dependent upon the speed at which information can be understood and/or accessed. The embodiments distribute information for the trading units to the electronic device 110 by presenting a single market indicator for each of the plurality of trading units as a dynamic display of an aggregation of a plurality of technical indicators summed across the plurality of time frames. The presentation of the market indicator enhances the understanding of the trading unit by the trader. The embodiments further select a first trading unit through a single action of the user input device 125 positioned over a particular area of the market indicator. In response to selecting the first trading unit, the embodiments retrieve trading unit data for the first trading unit in real time. The combination of the embodiments enhances the presentation of information about the trading units and the retrieval of the trading unit data for the user, increasing the efficiency of the electronic device 110.

Figure 2A:
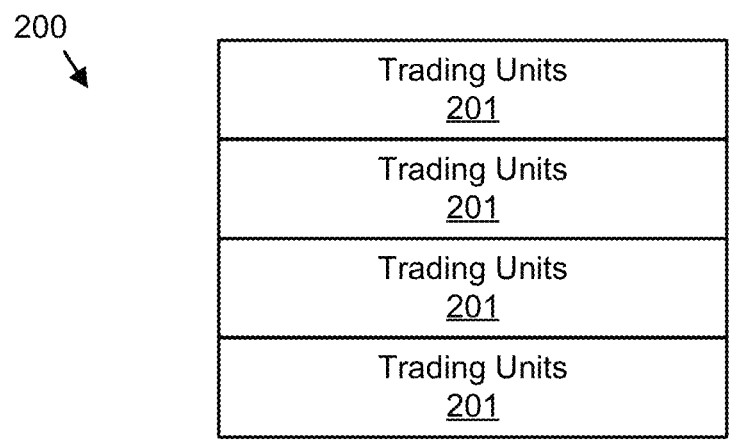
FIG. 2A is a schematic block diagram illustrating one embodiment of trading system data.

FIG. 2A is a schematic block diagram illustrating one embodiment of trading system data 200. The trading system data 200 may be used by the trading system 100. The trading system data 200 may be organized as a data structure in a memory. In the depicted embodiment, the trading system data 200 includes a plurality of trading units 201.

Figure 2B:
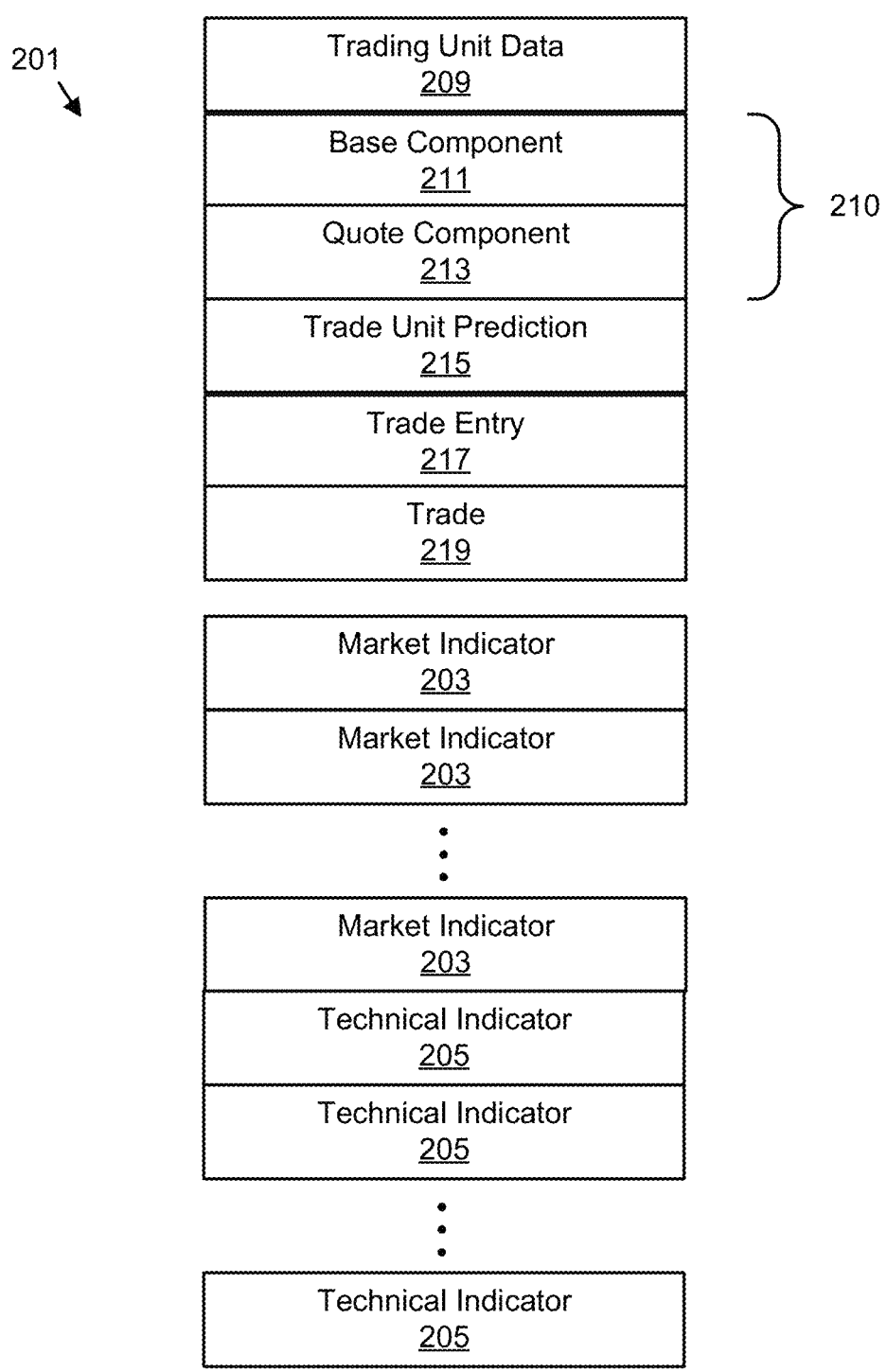
FIG. 2B is a schematic block diagram illustrating one embodiment of a trading unit.

FIG. 2B is a schematic block diagram illustrating one embodiment of a trading unit 201 of FIG. 2A. the trading unit 201 may be organized as a data structure in the memory. In the depicted embodiment, the trading unit 201 includes the trading unit data 209, a base component 211, a quote component 213, a trade unit prediction 215, a trade entry 217, and a trade 219. In addition, the trading unit 201 may include a plurality of market indicators 203 and/or a plurality of technical indicators 205.

The trading unit data 209 may include recent quotes for the trade unit 201, historical information for the trade unit 201, forecasts for the trade unit 201, expert opinions for the trade unit 201, and the like.

The base component 211 records a base currency of a foreign exchange trading unit 201. The quote component 213 records a second currency of the foreign exchange trading unit 201 that is traded against the base currency 211. The base component 211 and quote component 212 may form a currency pair 210. The currency pair 210 may indicate a trend for the base component 211 and the quote component 213.

The trade unit prediction 215 may predict a future price of the trade unit 201, a trend for the trade unit 201, and the like.

The trade entry 217 may indicate a potential trade for the trade unit 201. In one embodiment, the trade entry 217 is formatted as the trade 219.

The trade 219 may execute a trade in the trade unit 201 on one or more exchanges 120. In one embodiment, the trade 219 performs the trade entry 217.

The plurality of technical indicators 205 may comprise a currency matrix, a base vs quote matrix, a trend matrix, a scalping matrix, and/or matrix trade signals, which are described hereafter.

The market indicators 203 may each aggregate a plurality of technical indicators 205. The plurality of technical indicators 205 may be summed across a plurality of time frames. The plurality of time frames may comprise 2 minutes, 5 minutes, 8, minutes, 15 minutes, 30 minutes, 1 hour, 2 hours, 4 hours, 8 hours, and/or 1 week.

Figure 2C:
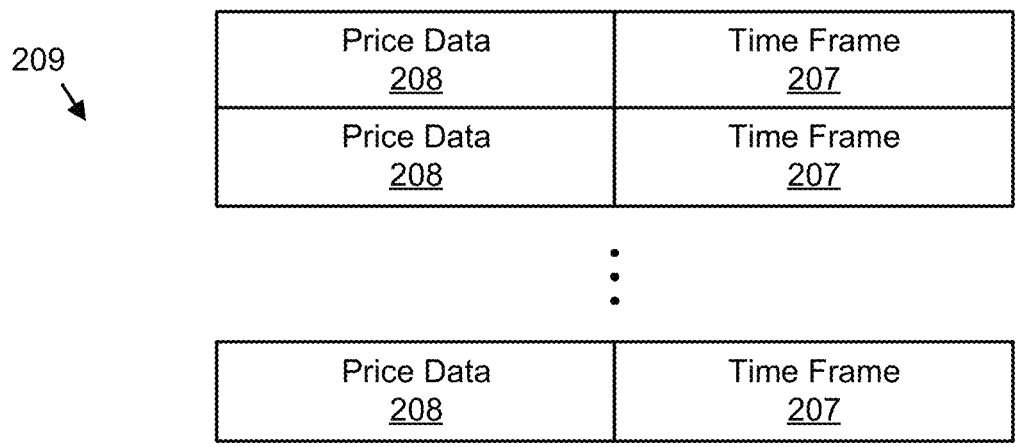
FIG. 2C is a schematic block diagram illustrating one embodiment of a trading unit data.

FIG. 2C is a schematic block diagram illustrating one embodiment of a trading unit data 209. The trading unit data 209 may comprise price data 208 for a plurality of time frames 207.

Figure 2D:
FIG. 2D is a schematic block diagram illustrating one embodiment of a trend data.

FIG. 2D is a schematic block diagram illustrating one embodiment of trend data 220. The trend data 220 may be organized as a data structure in a memory. In the depicted embodiment, the trend data includes a Predictive Bias Trend (PBT) 221, a short-term trend bias 223, an Average True Range (ATR) Speed 1 225, an ATR Speed 2 227, a global trend 229, and a scalping trend 231.

The PBT 221 may indicate a short-term trend for the trading unit 201 for a specified time interval 207. The short-term trend bias 223 may indicate a direction of the trading unit 201 for a specified time interval 207. The global trends 229 may indicate a trend for a plurality of trading units 201 for a specified time interval 207.

The ATR may indicate how much the price of the trading unit 201 has moved over a time interval 207. The ATR may measure of volatility of the trading unit 201. The ATR Speed 1 225 may indicate the ATR for a first time interval 207. The ATR Speed 2 227 may indicate the ATR for a second time interval 207.

The scalping trend 231 may indicate a plurality of profitable trades for a specified time interval 207.

Figure 3A:
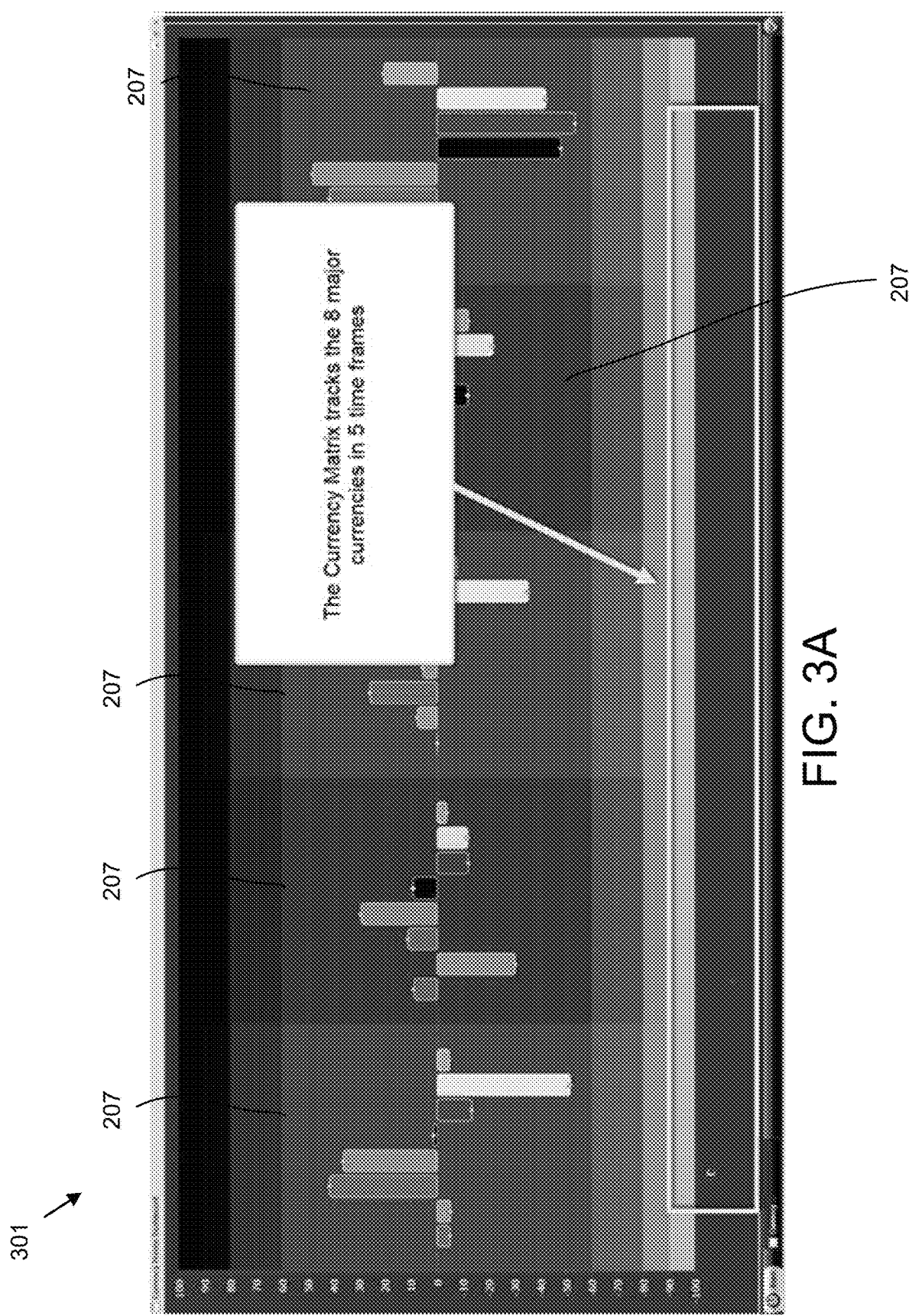
FIG. 3A is a screen shot illustrating one embodiment of a currency matrix.

FIG. 3A is a screen shot illustrating one embodiment of a currency matrix 301. The currency matrix 301 presents the base component 211 and the quote component 213 for a currency pair trading unit 201.

Figure 3B:
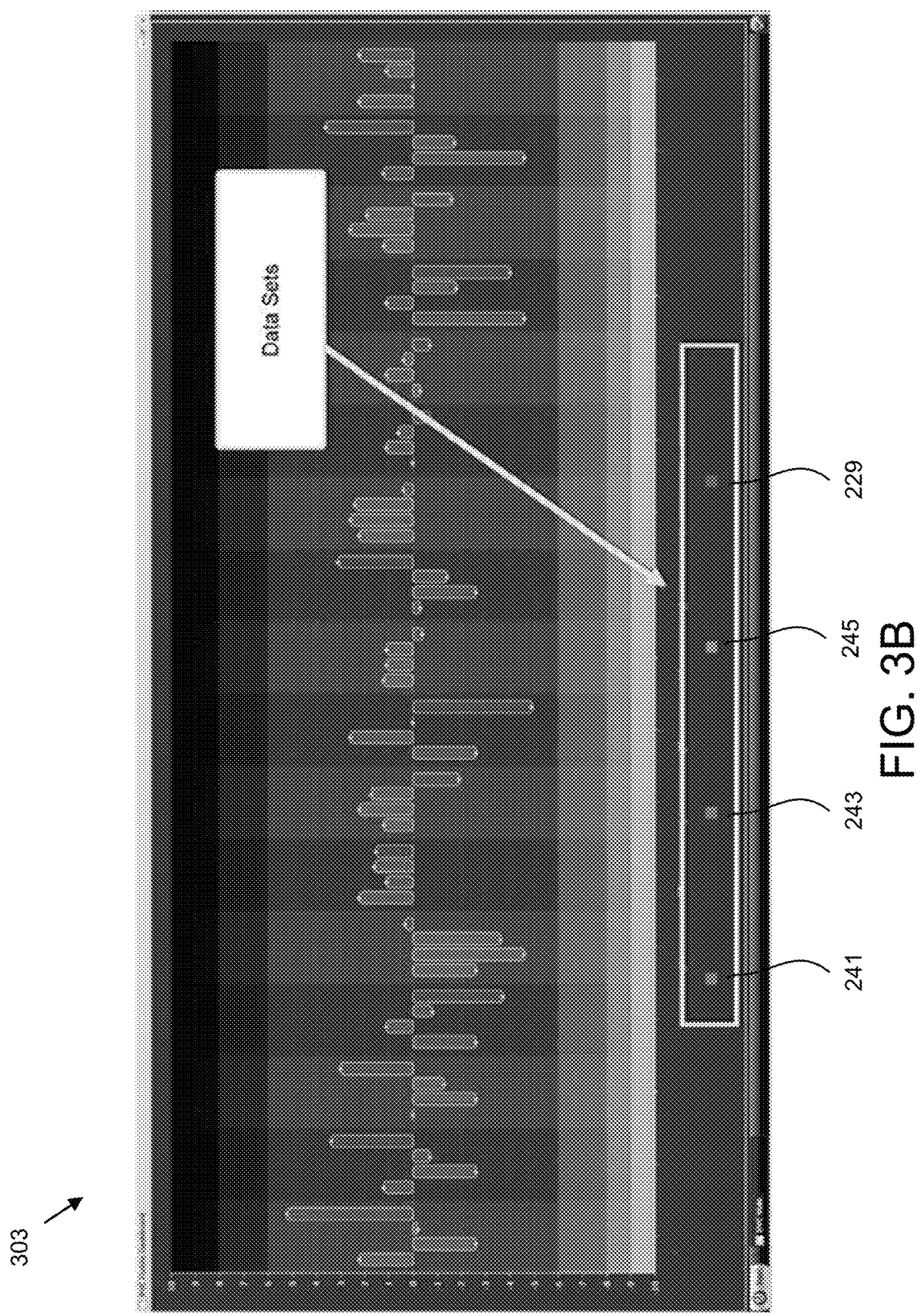
FIG. 3B is a screen shot illustrating one embodiment of a base vs quote matrix.

FIG. 3B is a screen shot illustrating one embodiment of a base vs quote matrix 303. The base vs quote 303 matrix may present a comparison of the base component 211 and the quote component 213 for a currency pair trading unit 201. In the depicted embodiment, the base vs quote 303 matrix includes a base value 241, a cross value 243, a base and across average 245, and the global trend value 229.

Figure 3C:
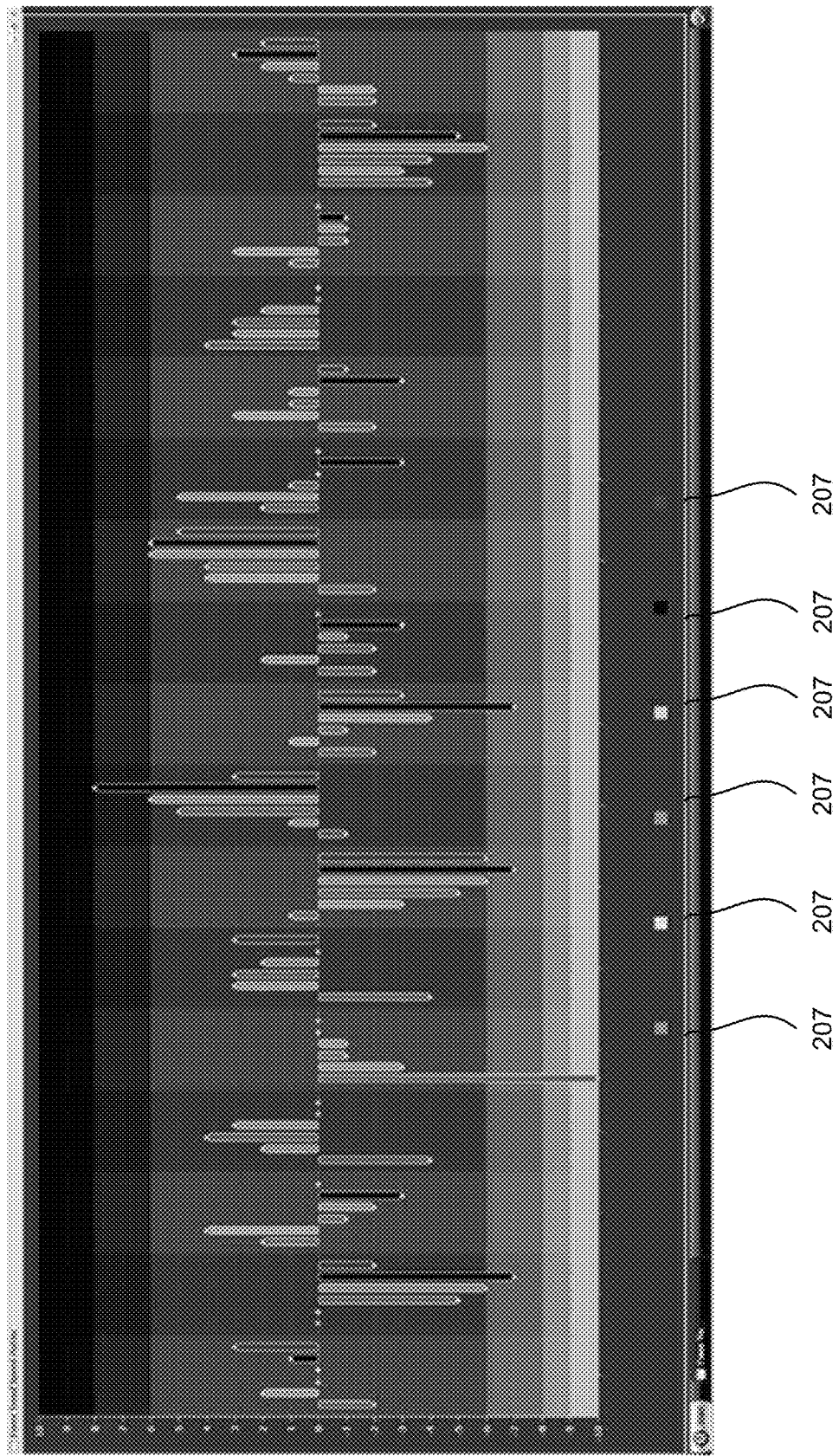
FIG. 3C is a screen shot illustrating one embodiment of a trend matrix.

FIG. 3C is a screen shot illustrating one embodiment of a trend matrix 305. The trend matrix 305 presents trends for the plurality of technical indicators 205. The plurality of technical indicators 205 may be presented for plurality of time intervals 207.

Figure 3D:
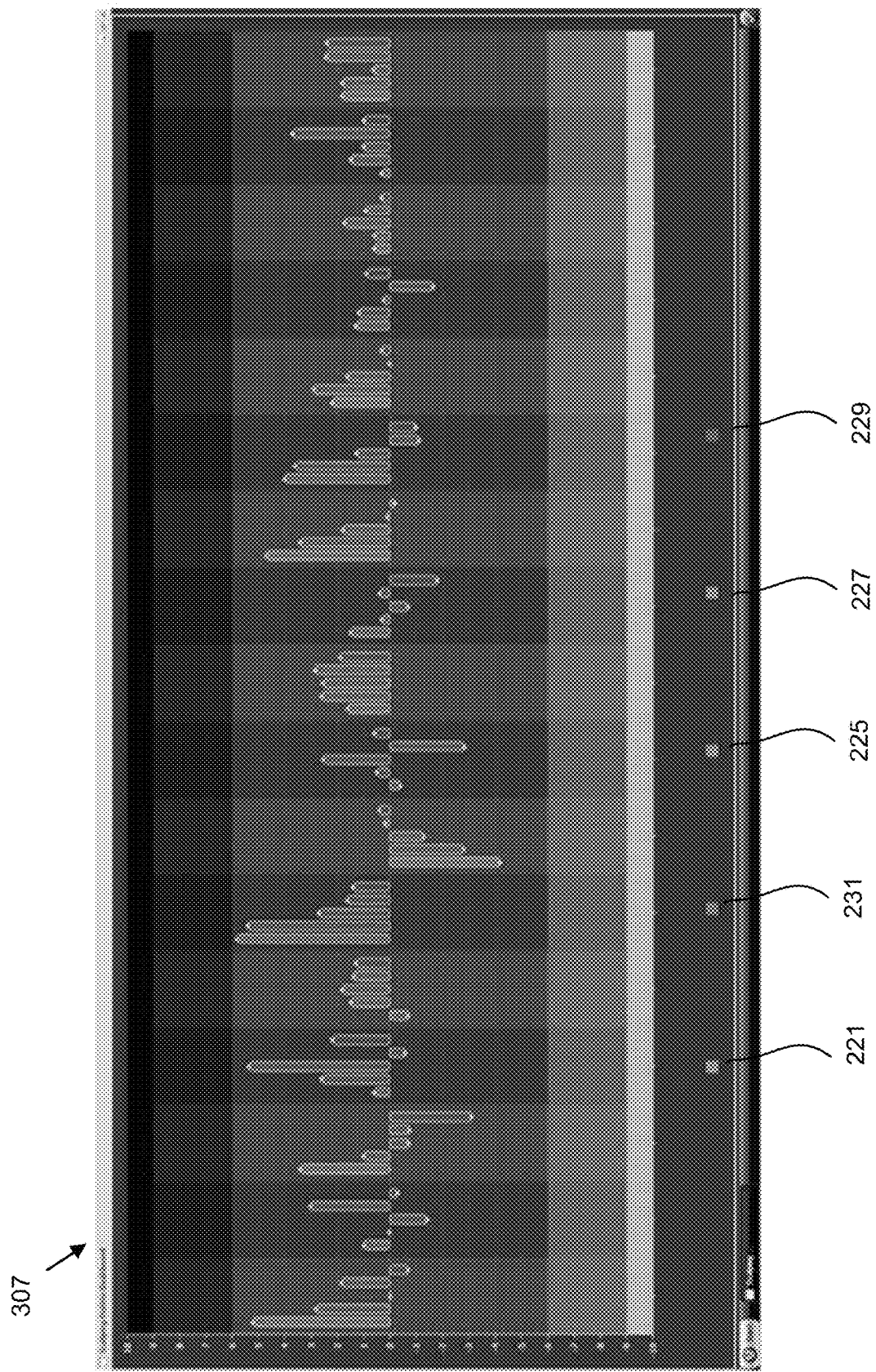
FIG. 3D is a screen shot illustrating one embodiment of a scalping matrix.

FIG. 3D is a screen shot illustrating one embodiment of a scalping matrix 307. The scalping matrix 307 combines data comprising the PBT 221, the short-term trend bias 223, the ATR Speed 1 225, the ATR Speed 2 227, and the Global Trend 229.

Figure 3E:
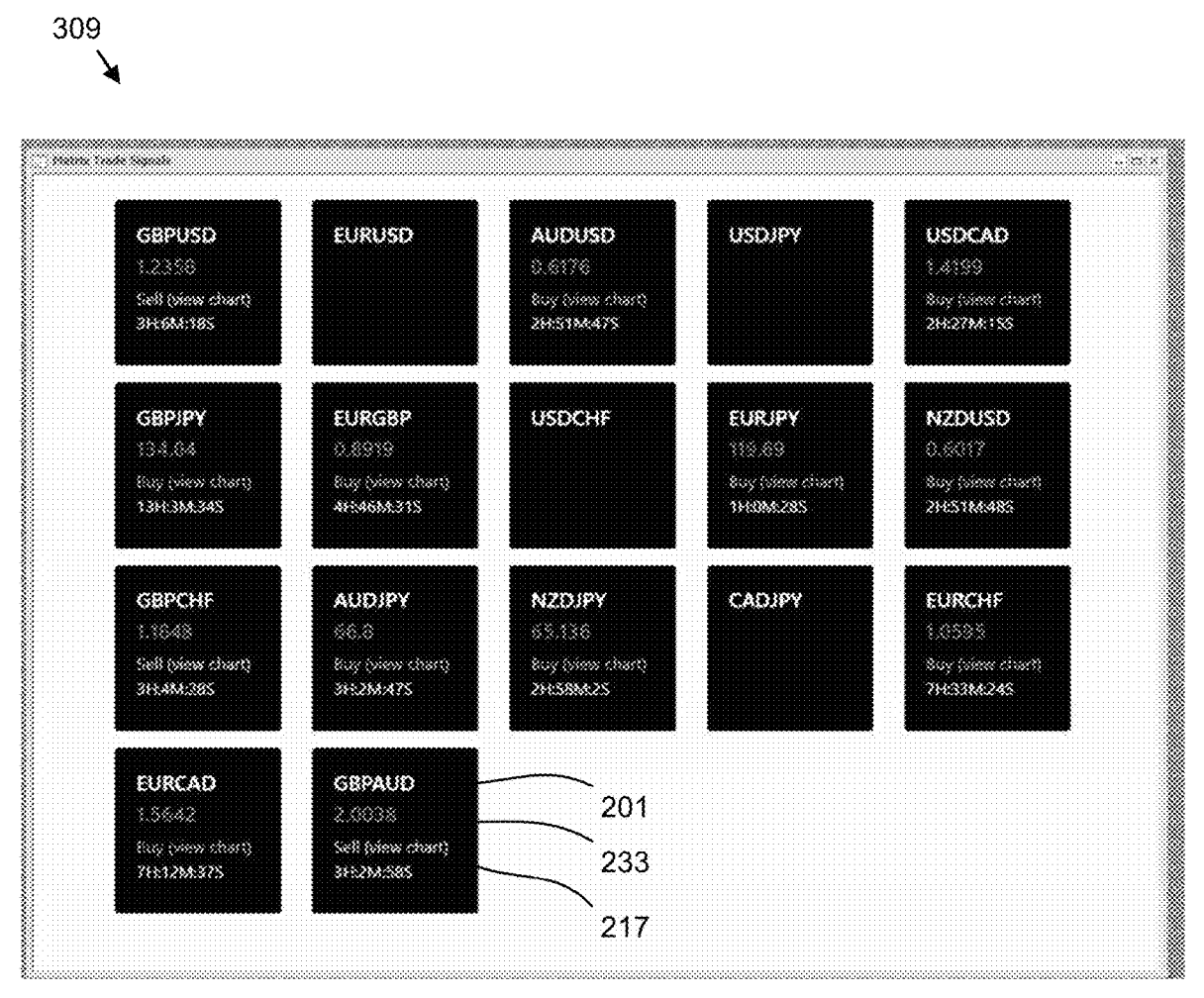

FIG. 3E is a screen shot illustrating one embodiment of matrix trade signals 309. In the depicted embodiment, trade signals 233 are shown for a plurality of currency pair trading units 201. The trade signals 233 may include a trade entry 217 for the plurality of trading units 201. The trade entry 217 may be a potential trade entry 217. For clarity, a single currency pair trading unit 201 is labeled. However, the labels apply to each currency pair trading unit 201.

Figure 3F:
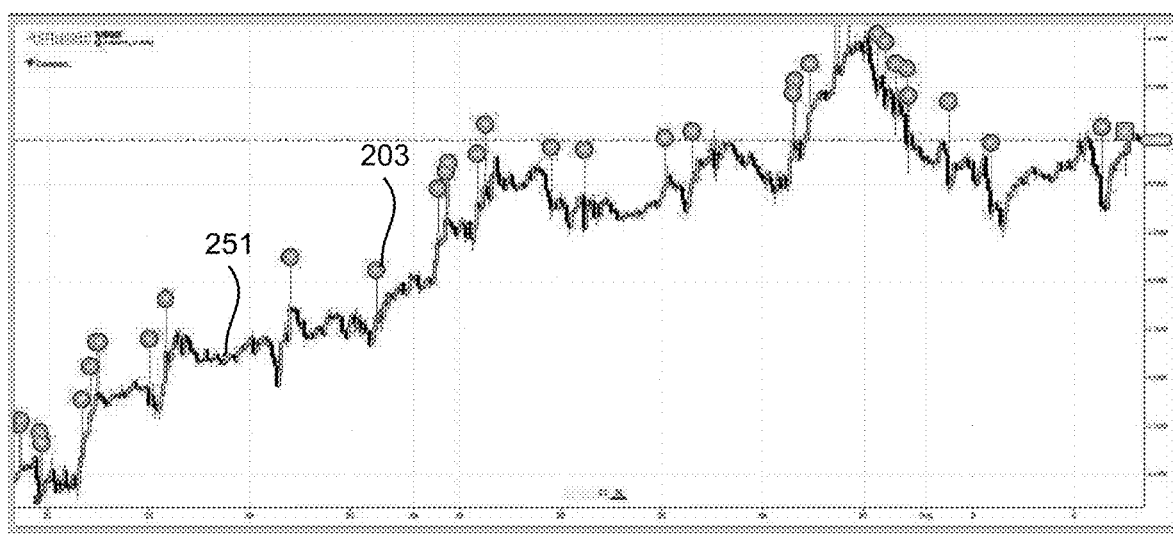
FIG. 3F is a screen shot illustrating one embodiment of market indicators.

FIG. 3F is a screen shot illustrating one embodiment of market indicators 203. In the depicted embodiment, market indicators 203 are presented for a trading unit 201 as a dynamic display on price data 251.

Figure 3G:
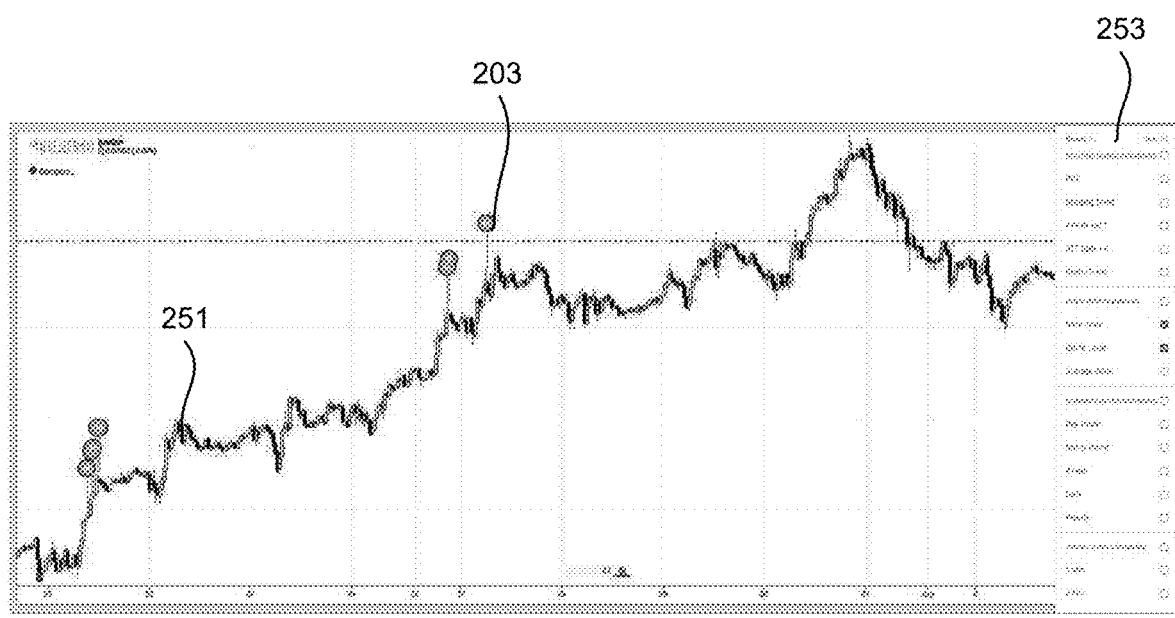
FIG. 3G is a screen shot illustrating one alternate embodiment of market indicators.
Figure 4A:
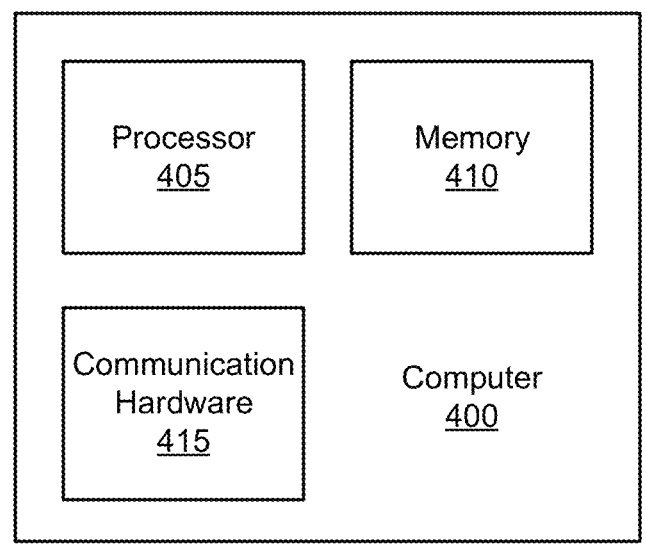
FIG. 4A is a schematic block diagram illustrating one embodiment of a computer.

FIG. 3G is a screen shot illustrating one alternate embodiment of market indicators;

FIG. 4A is a schematic block diagram illustrating one embodiment of a computer 400. The computer 400 may be used to calculate and present the single market indicator 203 for the trading units 201, retrieve trading unit data 209, and perform other functions. In the depicted embodiment, the computer 400 includes a processor 405, a memory 410, and communication hardware 415. The memory 410 may include a semiconductor storage device, a hard disk drive, an optical storage device, or combinations thereof. The memory 410 may store code and data. The processor 405 may execute the code and process the data. The communication hardware 415 may communicate with other devices and/or the network 115.

Figure 4B:
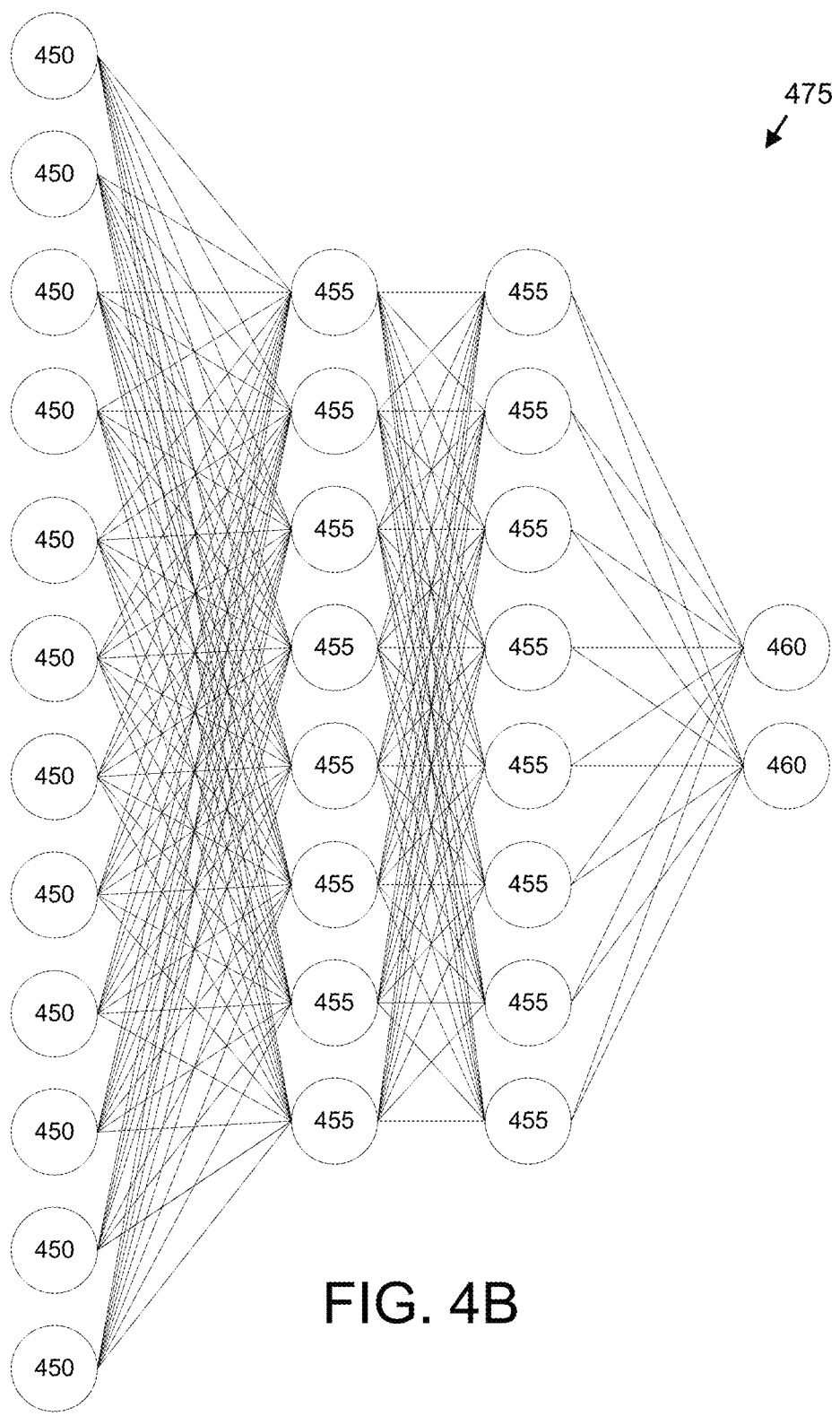
FIG. 4B is a schematic block diagram illustrating one embodiment of a neural network.

FIG. 4B is a schematic block diagram illustrating one embodiment of a neural network 475. In the depicted embodiment, the neural network 475 includes input neurons 450, hidden neurons 455, and output neurons 460. The neural network 475 may be organized as a convolutional neural network, a recurrent neural network, a long short-term memory (LSTM) network, and the like.

The neural network 475 may be trained with training data. The training data may include the trading system data 200. The neural network 475 may be trained using one or more learning functions while applying the training data to the input neurons 450 and known result values for the output neurons 460. Subsequently, the neural network 475 may receive actual data at the input neurons 450 and make predictions at the output neurons 460 based on the actual data. The actual data may include data from the trading system data 200.

Figure 5:
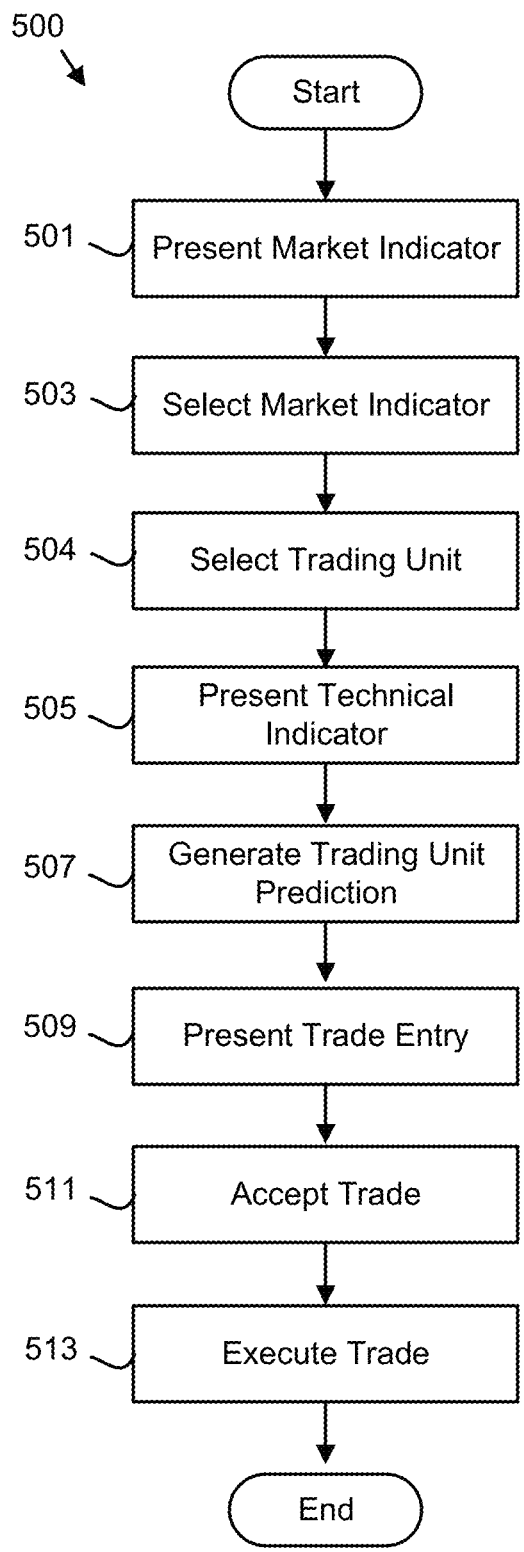
FIG. 5 is a schematic flow chart diagram illustrating one embodiment of a trade data presentation method.

FIG. 5 is a schematic flow chart diagram illustrating one embodiment of a trade data presentation method 500. The method 500 may present a market indicator 203 for trading units 201. The method 500 may further retrieve trading unit data 209 for a selected trading unit 201. The method 500 may be performed by the processor 405.

The method 500 starts, and in one embodiment, the processor 405 presents 501 a market indicator 203 for at least one trading unit 201 as a dynamic display on price data 251. The market indicator 203 may be presented as shown in FIGS. 3F and 3G.

The processor 405 may present 501 a market indicator 203 for each of at least one trading unit 201. A plurality of market indicators 203 may be presented 501 for the trading unit 201. In addition, the market indicators 203 may be sorted by the base component 211 and the quote component 213.

The processor 405 may select 503 a market indicator 203. In one embodiment, a first market indicator 203 of a plurality of market indicators 203 is selected. The market indicator may be selected 405 through a single action of a user input device 125 positioned over the market indicator 203.

The processor 405 may select 504 a trading unit 201. A first trading unit 201 of a plurality of trading units 201 may be selected 504. The trading unit 201 may be selected through a single action of the user input device 125 positioned over a particular area of the trading unit 201.

The processor 405 may present 505 the technical indicator 205 for the selected market indicator 203 and/or the selected trading unit 201. In addition, the processor 405 may present 505 the trading unit data 209. In one embodiment, the processor 405 retrieves and presents 505 the technical indicator 205 and/or trading unit data 209 in real time.

In one embodiment, the processor 405 generates 507 the trade unit prediction 215. The neural network 475 may be employed to generate 507 the trade unit prediction 215. In addition, the trade unit prediction 215 may be generated 507 using one or more machine learning models and/or one or more algorithms.

The processor 405 may present 509 the trade entry 217 to indicate a potential trade for the trade unit 201. The trade entry 217 may be based on the trade unit prediction 215. In one embodiment, the trade entry 217 may be communicated in real time via email and/or Short Message Service (SMS).

The processor 405 may accept 511 a trade 219. The trade 219 may be received from the electronic device 110. The trade 219 may be based on the trade entry 217. In addition, the processor 405 may execute 513 the trade 219 and the method 500 ends. In one embodiment, the processor 405 selects in exchange 120 and executes 513 the trade 219 with the exchange 120.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    presenting, by a processor, a plurality of market indicators for at least one trading unit as a dynamic display on price data, wherein each trading unit comprises a base component recording a base currency, a quote component recording a second currency that is traded against the base currency, and a trade unit prediction that predicts a future price of the trade unit, and each market indicator is an icon connected to the price data and aggregates a plurality of technical indicators;
    selecting, by the processor, a market indicator of the plurality of market indicators through a single action of a user input device positioned over the selected market indicator;
    selecting, by the processor, a trading unit of the at least one trading unit;
    presenting, by the processor, a technical indicator of the plurality of technical indicators for the selected market indicator in real time, wherein the technical indicator is summed across a plurality of time frames;
    generating, by the processor, the trade unit prediction for the selected trading unit that predicts a future price of the selected trade unit using a neural network and/or machine learning model trained from historical data;
    presenting, by the processor, a trade entry for the selected trading unit, wherein the trade entry is based on the trade unit prediction;
    accepting, by the processor, a trade for the trade entry for the selected trading unit; and
    executing, by the processor, the trade for the trade entry.

2. The method of claim 1, wherein the technical indicator is selected from the group a currency matrix, a base vs quote matrix, a trend matrix, a scalping matrix, and/or matrix trade signals.

3. The method of claim 2, wherein the currency matrix presents a base component and a quote component for the trading unit.

4. The method of claim 2, wherein the base vs quote matrix that presents a comparison of a base component and a quote component for the trading unit.

5. The method of claim 2, wherein the trend matrix presents trends for the plurality of technical indicators for the plurality of time intervals.

6. The method of claim 2, wherein the scalping matrix combines data comprising Predictive Bias Trend (PBT), a short-term trend bias, an Average True Range (ATR) Speed 1, an ATR Speed 2, and a Global Trend.

7. The method of claim 2, wherein the matrix trade signals presents the trade entry for the plurality of trading units.

8. The method of claim 7, wherein the trade entry communicated in real time via email and/or Short Message Service (SMS).

9. The method of claim 1, wherein the plurality of time frames comprises 2 minutes, 5 minutes, 8, minutes, 15 minutes, 30 minutes, 1 hour, 2 hours, 4 hours, 8 hours, and/or 1 week.

10. The method of claim 1, wherein each market indicator is sorted by a base component and a quote component.

11. An apparatus comprising:
    a processor;
    a memory storing code executable by the processor to perform:

presenting a plurality of market indicators for at least one trading unit as a dynamic display on price data, wherein each trading unit comprises a base component recording a base currency, a quote component recoding a second currency that is traded against the base currency, and a trade unit prediction that predicts a future price of the trade unit, and each market indicator is an icon connected to the price data and aggregates a plurality of technical indicators;

selecting a market indicator of the plurality of market indicators through a single action of a user input device positioned over the selected market indicator;

selecting a trading unit of the at least one trading unit;

presenting a technical indicator of the plurality of technical indicators for the selected market indicator in real time, wherein the technical indicator is summed across a plurality of time frames;

generating the trade unit prediction for the selected trading unit that predicts a future price of the selected trade unit using a neural network and/or machine learning model trained from historical data;

presenting a trade entry for the selected trading unit, wherein the trade entry is based on the trade unit prediction;

accepting a trade for the trade entry for the selected trading unit; and executing the trade for the trade entry.

12. The apparatus of claim 11, wherein the technical indicator is selected from the group a currency matrix, a base vs quote matrix, a trend matrix, a scalping matrix, and/or matrix trade signals.

13. The apparatus of claim 12, wherein the currency matrix presents a base component and a quote component for each trading unit.

14. The apparatus of claim 12, wherein the base vs quote matrix that presents a comparison of a base component and a quote component for the trading unit, the trend matrix presents trends for a plurality of technical indicators for a plurality of time intervals, the scalping matrix combines data comprising Predictive Bias Trend (PBT), a short-term trend bias, an Average True Range (ATR) Speed 1, an ATR Speed 2, and a Global Trend, and the matrix trade signals presents the trade entry for the plurality of trading units.

15. The apparatus of claim 11, wherein the plurality of time frames comprises 2 minutes, 5 minutes, 8, minutes, 15 minutes, 30 minutes, 1 hour, 2 hours, 4 hours, 8 hours, and/or 1 week.

16. A program product comprising a non-transitory computer readable storage medium that stores code executable by a processor, the executable code comprising code to perform:

presenting a plurality of market indicators for at least one trading unit as a dynamic display on price data, wherein each trading unit comprises a base component recording a base currency, a quote component recoding a second currency that is traded against the base currency, and a trade unit prediction that predicts a future price of the trade unit, and each market indicator is an icon connected to the price data and aggregates a plurality of technical indicators;

selecting a market indicator of the plurality of market indicators through a single action of a user input device positioned over the market indicator;

selecting a trading unit of the at least one trading unit;

presenting a technical indicator of the plurality of technical indicators for the selected market indicator in real time, wherein the technical indicator is summed across a plurality of time frames;

generating the trade unit prediction for the selected trading unit that predicts a future price of the selected trade unit using a neural network and/or machine learning model trained from historical data;

presenting a trade entry for the selected trading unit, wherein the trade entry is based on the trade unit prediction;

accepting a trade for the trade entry for the selected trading unit; and executing the trade for the trade entry.

* * * * *